United States Patent
Ham et al.

(10) Patent No.: US 10,276,875 B2
(45) Date of Patent: Apr. 30, 2019

(54) ANODE FOR MOLTEN CARBONATE FUEL CELL HAVING IMPROVED CREEP PROPERTY, METHOD FOR PREPARING THE SAME, AND MOLTEN CARBONATE FUEL CELL USING THE ANODE

(71) Applicant: KOREA INSTITUTE OF SCIENCE AND TECHNOLOGY, Seoul (KR)

(72) Inventors: Hyung Chul Ham, Seoul (KR); Min-Jae Lee, Seoul (KR); Chang-Whan Lee, Seoul (KR); Seong Cheol Jang, Seoul (KR); Sun-Hee Choi, Seoul (KR); Hyun Seo Park, Seoul (KR); Chang Won Yoon, Seoul (KR); Sung Pil Yoon, Seoul (KR); Jonghee Han, Seoul (KR); Suk Woo Nam, Seoul (KR); Tae Hoon Lim, Seoul (KR); Jin Young Kim, Seoul (KR)

(73) Assignee: Korean Institute of Science and Technology, Seoul (KR)

( * ) Notice: Subject to any disclaimer, the term of this patent is extended or adjusted under 35 U.S.C. 154(b) by 113 days.

(21) Appl. No.: 15/374,732

(22) Filed: Dec. 9, 2016

(65) Prior Publication Data
US 2017/0187043 A1    Jun. 29, 2017

(30) Foreign Application Priority Data
Dec. 23, 2015 (KR) .................. 10-2015-0185282

(51) Int. Cl.
 *H01M 4/86*   (2006.01)
 *H01M 4/90*   (2006.01)
 (Continued)

(52) U.S. Cl.
 CPC ....... *H01M 4/8663* (2013.01); *H01M 4/8857* (2013.01); *H01M 4/8885* (2013.01);
 (Continued)

(58) Field of Classification Search
 CPC ......... H01M 2008/147; H01M 4/8663; H01M 4/8857; H01M 4/8885; H01M 4/905; H01M 8/145
 See application file for complete search history.

(56) References Cited

U.S. PATENT DOCUMENTS

| | | | |
|---|---|---|---|
| 2003/0096155 A1* | 5/2003 | Hong | H01M 4/8621 429/478 |
| 2005/0050991 A1 | 3/2005 | Han et al. | |

(Continued)

FOREIGN PATENT DOCUMENTS

| | | |
|---|---|---|
| KR | 10-2005-0025747 A | 3/2005 |
| KR | 10-2006-0088166 A | 8/2006 |

(Continued)

*Primary Examiner* — Carlos Barcena
(74) *Attorney, Agent, or Firm* — Goldilocks Zone IP Law (57) ABSTRACT

An anode for a molten carbonate fuel cell (MCFC) having improved creep property by adding $CeO_2$ and/or Cr for imparting creep resistance to nickel-aluminum alloy and nickel as materials for an anode is provided. Improved sintering property, creep property and increased mechanical strength of a molten carbonate fuel cell may be obtained accordingly.

11 Claims, 6 Drawing Sheets

(51) Int. Cl.
*H01M 4/88* (2006.01)
*H01M 8/14* (2006.01)
(52) U.S. Cl.
CPC ........... *H01M 4/905* (2013.01); *H01M 8/145* (2013.01); *H01M 2008/147* (2013.01); *Y02E 60/526* (2013.01)

(56) References Cited

U.S. PATENT DOCUMENTS

| | | | |
|---|---|---|---|
| 2006/0171839 A1 | 8/2006 | Yoon et al. | |
| 2008/0085442 A1* | 4/2008 | Hilmi | H01M 4/8652 429/478 |
| 2008/0157419 A1* | 7/2008 | Ryu | B22F 3/1039 264/104 |
| 2009/0246562 A1 | 10/2009 | Hilmi et al. | |
| 2011/0250521 A1* | 10/2011 | Moon | H01M 4/8657 429/478 |

FOREIGN PATENT DOCUMENTS

| | | |
|---|---|---|
| KR | 10-2010-0079108 A | 7/2010 |
| KR | 10-2010-0079109 A | 7/2010 |
| KR | 10-2010-0132534 A | 12/2010 |
| WO | WO 2009/120439 A1 | 10/2009 |

\* cited by examiner

ANODE FOR MOLTEN CARBONATE FUEL CELL HAVING IMPROVED CREEP PROPERTY, METHOD FOR PREPARING THE SAME, AND MOLTEN CARBONATE FUEL CELL USING THE ANODE

CROSS-REFERENCE TO RELATED APPLICATION

This application claims priority to Korean Patent Application No. 10-2015-0185282, filed on Dec. 23, 2016, and all the benefits accruing therefrom under 35 U.S.C. § 119, the contents of which in its entirety are herein incorporated by reference.

BACKGROUND

1. Field

The present disclosure relates to a nickel-aluminum alloy anode for a molten carbonate fuel cell having improved creep property, a method for preparing the same, and a molten carbonate fuel cell using the anode.

DESCRIPTION ABOUT NATIONAL SUPPORT RESEARCH AND DEVELOPMENT

This study is conducted by the support of Ministry of Trade, Industry and Energy, and the research title is Development of Technology for Mass Production of Key Components for Long-Term Service Life of MCFC (Subject Identification No.: 1415137344).

2. Description of the Related Art

A fuel cell converts chemical energy into electric energy from various fuels, such as hydrogen, ethanol, methanol and natural gas, without any combustion process, and shows a high efficiency of 40% or more, emits no environmentally harmful materials, such as NOx and SOx, and thus is eco-friendly.

Among such fuel cells, a molten carbonate fuel cell uses a molten carbonate, such as $(Li/K)_2CO_3$ or $(Li/Na)_2CO_3$, as an electrolyte, and is a high-temperature type fuel cell operated at 600-700° K. Since a molten carbonate fuel cell operates at high temperature, it allows combined power generation through waste heat recovery. In addition, since a molten carbonate fuel cell has a high electrochemical reaction rate, it uses Ni as a catalyst instead of an expensive Pt catalyst. By virtue of the above-mentioned characteristics, an anode for a molten carbonate fuel cell is frequently obtained through Ni powder.

However, since a molten carbonate fuel cell operates at high temperature under a pressure of several $kg/cm^2$, it may cause deformation of porous Ni in an anode. To inhibit such deformation of a Ni anode, there have been suggested a method of adding Cr and Cu, a method of adding an oxide, such as $Al_2O_3$ or $SrTiO_2$, and a method of adding a metallic compound, such as Ni—Cr, Ni—Al or $Ni_3Al$.

However, in the case of operation of an anode to which Cr is added, there is a problem in that Cr of the anode may react with $LiCO_3$ of an electrolyte to form $LiCrO_2$, thereby forming micropores in the electrode and inhibiting the activity of the electrode.

Meanwhile, in the case of Ni—Al alloy using Al instead of Cr, such a problem of micropore formation does not occur substantially, and thus many attentions have been given to Ni—Al alloy as a substitute for an anode using Ni alone.

For example, there has been disclosed an anode obtained by attaching nickel mesh to an anode green sheet and carrying out lamination and compression in order to enhance the strength of the anode (Korean Patent Application Publication No. 2010-0079108).

Meanwhile, there has been disclosed a method for manufacturing a nickel-aluminum alloy anode by using nickel powder. In the method, nickel powder is used to sinter nickel-aluminum alloy having a difficulty in sintering (Korean Patent Application Publication No. 2005-0025747).

However, according to the observations by the present inventors, the method is disadvantageous in that nickel added for the method causes degradation of creep property.

SUMMARY

In one aspect, the present disclosure is directed to providing a nickel-aluminum alloy anode for a molten carbonate fuel cell, which may improve creep resistance and sintering property, and thus solve the problems caused by sintering of nickel and creep occurring under a high-temperature pressurized operation condition of a molten carbonate fuel cell. In other aspects, the present disclosure is also directed to providing a method for preparing the nickel-aluminum alloy anode for a molten carbonate fuel cell, a method for improving creep property of an anode for a molten carbonate fuel cell, and a molten carbonate fuel cell using the anode.

In example embodiments, there is provided a method for preparing a nickel-aluminum alloy anode for a molten carbonate fuel cell, wherein the method includes adding at least one additive for imparting creep resistance selected from the group consisting of $CeO_2$ and Cr to nickel-aluminum alloy and nickel to improve creep property.

In an example embodiment, the additive for imparting creep resistance may be added to nickel-aluminum powder and nickel powder, a resultant mixture may be subjected to tape casting to obtain a sheet, and then sintering may be carried out.

In an example embodiment, the sheet may be mounted to a molten carbonate fuel cell and then sintering may be carried out in the molten carbonate fuel cell.

In an example embodiment, dispersant, plasticizer, solvent, binder and defoamer may be further added in the method.

In an example embodiment, the method may comprise mixing $CeO_2$ with dispersant, solvent and defoamer, and subjecting the mixture to primary ball milling; mixing the resultant mixture with nickel-aluminum alloy and nickel powder, plasticizer and binder after the primary ball milling, and subjecting the resultant mixture to secondary ball milling; and carrying out de-airing and tape casting after the secondary ball milling.

In an example embodiment, the method may comprise subjecting dispersant, solvent and defoamer to primary ball milling; mixing the mixture with nickel-aluminum alloy and nickel powder, plasticizer, binder and Cr after the primary ball milling, and subjecting the resultant mixture to secondary ball milling; and carrying out de-airing and tape casting after the secondary ball milling.

In example embodiments, there is provided a nickel-aluminum alloy anode for a molten carbonate fuel cell, wherein the anode is a anode of sintered nickel and nickel-aluminum alloy, and at least one additive for imparting creep resistance selected from the group consisting of $CeO_2$ and Cr is attached to at least one of nickel and nickel-aluminum alloy to improve creep property.

In an example embodiment, the additive for imparting creep resistance selected from the group consisting of $CeO_2$ and Cr may interrupt a creep phenomenon on the nickel or nickel-aluminum alloy surface, thereby improving creep resistance.

In an example embodiment, the nickel-aluminum alloy may be present in an amount of 30-70 wt % based on the weight of the nickel-aluminum alloy and nickel.

In an example embodiment, the additive for imparting creep resistance may be used in an amount of 0.2-5 wt % based on the total weight of the nickel-aluminum and nickel.

In an example embodiment, $CeO_2$ may have a size of 20 nm-0.3 μm and Cr may have a size of 1-5 μm.

In example embodiments, there is provided a molten carbonate fuel cell including the anode.

In example embodiments, there is provided a method for improving creep property of an anode for a molten carbonate fuel cell, wherein the method includes adding at least one additive for imparting creep resistance selected from the group consisting of $CeO_2$ and Cr to nickel-aluminum alloy and nickel.

According to example embodiments of the present disclosure, it is possible to improve the sintering property and creep property of an anode for a molten carbonate fuel cell by adding at least one additive for imparting creep resistance selected from the group consisting of $CeO_2$ and Cr to a nickel-aluminum alloy and nickel, while improving mechanical properties as well.

BRIEF DESCRIPTION OF THE DRAWINGS

The above and other aspects, features and advantages of the disclosed example embodiments will be more apparent from the following detailed description taken in conjunction with the accompanying drawings in which.

DETAILED DESCRIPTION

Example embodiments are described more fully hereinafter. The invention may, however, be embodied in many different forms and should not be construed as limited to the example embodiments set forth herein. Rather, these example embodiments are provided so that this disclosure will be thorough and complete, and will fully convey the scope of the invention to those skilled in the art. In the description, details of features and techniques may be omitted to more clearly disclose example embodiments.

The terminology used herein is for the purpose of describing particular embodiments only and is not intended to be limiting of the invention. As used herein, the singular forms "a," "an" and "the" are intended to include the plural forms as well, unless the context clearly indicates otherwise. Furthermore, the use of the terms a, an, etc. do not denote a limitation of quantity, but rather denote the presence of at least one of the referenced item. The terms "first," "second," and the like do not imply any particular order, but are included to identify individual elements. Moreover, the use of the terms first, second, etc. do not denote any order or importance, but rather the terms first, second, etc. are used to distinguished one element from another.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

As used herein, creep phenomenon means a phenomenon in which an electrode is deformed continuously with the lapse of time under the application of a load to the electrode.

As used herein, the expression 'creep property is improved' means that creep resistance is improved.

Hereinafter, example embodiments will be described in more detail.

The inventors of the present disclosure have noted that sintering of Ni and a creep phenomenon are the main causes of the deformation of an anode under the operation environment of a molten carbonate fuel cell, such as operation conditions of 600-700° C. and 1-5 $kgf/cm^2$.

That is, a sintering phenomenon occurs wherein a porous anode including Ni as a main ingredient undergoes neck growth between Ni particles under high temperature and pressurization, which is an operation environment of a molten carbonate fuel cell, and thus the particles are densified. In addition, a creep phenomenon occurs when the pore structure undergoes shrinking in thickness under a pressurized condition.

There are three types of deformation. First, sintering occurs by the diffusion in Ni particles and on the surface thereof. As a result, the surface area of the pore structure is decreased. Second, the particle shapes are changed according to the grain boundary dislocation under the physical pressure caused by the surface pressure. Third, the particles forming the pore structure are rearranged under the application of physical pressure and creep occurs due to the interparticle sliding.

Thus, in the present disclosure, provided is a high-quality anode having improved creep property through the improvement of creep resistance and sintering property, and a molten carbonate fuel cell using the same.

Particularly, in example embodiments of the present disclosure, at least one additive for imparting creep resistance selected from the group consisting of $CeO_2$ and Cr is added to nickel-aluminum alloy powder and nickel powder and sintering is carried out.

First, according to example embodiments, Ni powder is mixed with Ni—Al alloy to obtain an anode. When using Ni powder alone, creep property is very poor. When using Ni—Al alloy alone to improve creep property, sintering does not occur under reductive atmosphere, thereby making it difficult to obtain a sheet-like structure. This may serve as a serious problem in the assemblage and operation of a molten carbonate fuel cell.

Therefore, Ni powder capable of sintering and Ni—Al are used as base materials and, together with this, an oxide type additive of $CeO_2$ and/or Cr for imparting creep resistance is added to solve the problem of degradation of creep property caused by addition of Ni powder, thereby improving creep property. As well, it is possible to increase the mechanical strength of an anode by adding $CeO_2$ and/or Cr. Although both $CeO_2$ and Cr are capable of improving creep resistance and increasing mechanical strength, $CeO_2$ may be used more advantageously in view of the stability under MCFC environment.

In an example embodiment, after the additive for imparting creep resistance is added to nickel-aluminum alloy powder and nickel powder, a green sheet may be formed through a tape casting process and the green sheet may be sintered to obtain an anode. The tape casting allows mass production with a large area, and thus is suitable for the production of an anode for a molten carbonate fuel cell.

In an example embodiment, the obtained anode may be assembled with a molten carbonate fuel cell, for example, by using nickel mesh and sintering may be carried out in situ in the inner part of the cell. Then, the fuel cell may be operated.

In a non-limiting example, the additive ($CeO_2$) may be mixed with a dispersant, solvent and a defoamer, the mixture may be subjected to primary ball milling, nickel-aluminum alloy (Ni—Al alloy) and nickel (Ni) powder, a plasticizer and a binder may be added thereto, and the resultant mixture may be subjected to secondary ball milling, followed by de-airing, tape casting and drying (see FIG. 1 which will be explained below).

In a non-limiting example, a dispersant, solvent and a defoamer may be subjected to primary ball milling, the mixture may be further mixed with Ni—Al alloy and Ni powder, a plasticizer, binder and an additive (Cr) for imparting creep resistance, and the resultant mixture may be subjected to secondary ball milling, followed by de-airing, tape casting and drying (see FIG. 2 which will be explained below).

Since the particle size of Cr powder is similar to that of Ni and Ni—Al alloy powder, they may be introduced during the same step. However, since $CeO_2$ is smaller in size than Ni and Ni—Al alloy powder, dispersion of $CeO_2$ is induced through primary ball milling.

In an example embodiment, Ni—Al alloy may be used in an amount of 30-70 wt %, the balance being Ni powder. The amount of Ni—Al alloy may affect creep resistance, etc. When the amount of Ni—Al alloy is less than the above range, creep resistance may be degraded. Thus, Ni—Al alloy may be used in an amount of 30 wt % or more. In addition, when Ni—Al alloy is used in an excessively large amount more than 70 wt %, the electrode may show poor sintering property.

In a non-limiting example, Ni powder and Ni—Al alloy may be used in an amount of 60% and 40%, respectively.

In a non-limiting example, Al may be used in an amount of 3-15 wt %, more particularly 5 wt %, based on the weight of Ni—Al alloy (i.e., Ni-5 wt % Al alloy).

In an example embodiment, $CeO_2$ and/or Cr may be used in an amount of 0.5-5 wt % based on the total weight of Ni—Al alloy and Ni powder. To improve creep resistance, $CeO_2$ and/or Cr may be used in an amount of 0.5 wt % or more. When $CeO_2$ and/or Cr is used in an excessively large amount more than 5 wt %, electrochemical reactivity may be degraded.

In an example embodiment, $CeO_2$ may have a size of 20 nm-0.3 μm and Cr may have a size of 1-5 μm. When each additive has a much smaller size than the above-defined range, it may be difficult to disperse the additive in slurry. When each additive has a much bigger size than the above-defined range, the effect of improving creep property may be decreased.

In example embodiments, there is provided an anode of sintered nickel and nickel-aluminum alloy, wherein at least one additive for imparting creep resistance selected from $CeO_2$ and Cr is attached to at least one of nickel and nickel-aluminum alloy to improve creep property.

Since $CeO_2$ and Cr have a much smaller size than Ni powder, they may be attached onto Ni powder and Ni—Al alloy. The attached $CeO_2$ and Cr particles interrupt a creep phenomenon on the Ni surface and/or Ni—Al alloy surface, thereby improving creep resistance. In addition, it is possible to improve mechanical strength as well.

In this manner, it is possible to prevent sintering caused by diffusion, creep caused by compression and creep caused by interparticle sliding, thereby providing an anode for a molten carbonate fuel cell having improved creep property and a molten carbonate fuel cell using the same.

As can be seen from the following non-limiting examples, the anode shows high performance, and thus may be applied to a molten carbonate fuel cell.

In example embodiments of the present disclosure, there is provided a method for improving creep property of an anode for a molten carbonate fuel cell, the method including adding at least one additive for imparting creep resistance selected from the group consisting of $CeO_2$ and Cr to nickel-aluminum alloy and nickel.

Example embodiments now will be described more fully hereinafter with reference to the accompanying drawings, in which example embodiments are shown. The present disclosure may, however, be embodied in many different forms and should not be construed as limited to the example embodiments set forth therein. Rather, these example embodiments are provided so that the present disclosure will be thorough and complete, and will fully convey the scope of the present disclosure to those skilled in the art.

Example 1

Figure 1:
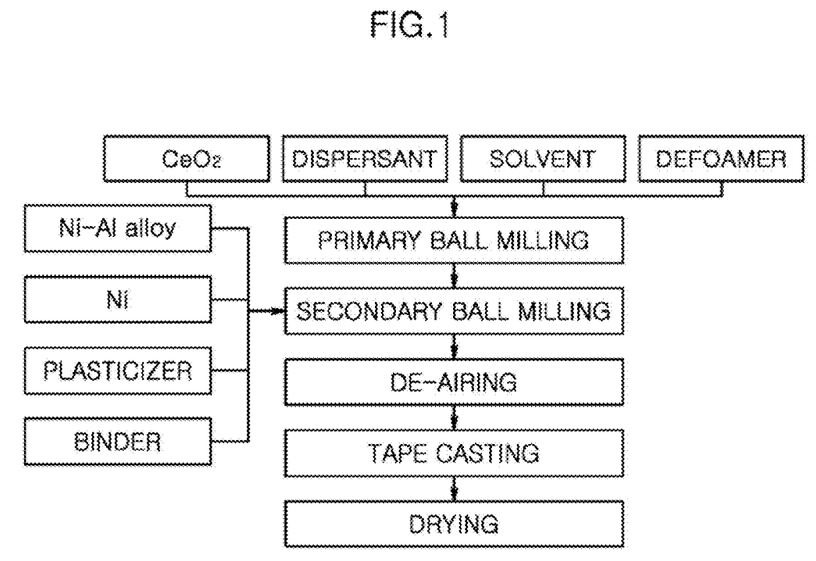
FIG. 1 is a flow chart illustrating a method for manufacturing Ni and Ni—Al alloy anode using $CeO_2$ as an additive in Example 1.

FIG. 1 is a flow chart illustrating a method for manufacturing Ni and Ni—Al alloy anode using $CeO_2$ as an additive in Example 1.

As shown in FIG. 1, in this Example, there is provided a Ni—Al alloy anode for a molten carbonate fuel cell having improved creep property by using $CeO_2$ as an additive.

Three different anodes are provided by using the additive in a different amount of 0.5 wt %, 1 wt %, 2 wt %.

Particularly, in the case of $CeO_2$, a dispersant, defoamer, solvent and nano-sized $CeO_2$ are mixed in a primary ball mill, and alumina balls are added thereto to carry out primary ball milling for 24 hours.

After the primary ball milling, a plasticizer, binder and Ni—Al alloy and Ni powder are further added to the resultant mixture and secondary ball milling is carried out for 48 hours to obtain slurry. The prepared slurry is subjected to de-airing to remove the bubbles generated during the ball milling. Then, tape casting is carried out to form the slurry into a green sheet.

The following Table 1 shows a compositional ratio of the Ni—Al alloy anode for a molten carbonate fuel cell having improved creep property by using $CeO_2$ as an additive.

TABLE 1

| | Weight ratio | Characteristics |
|---|---|---|
| CeO₃ | 0.5/1/2 | Nanopowder < 25 nm |
| Ni | 60 | INCO Type 255 |
| Ni—Al alloy | 40 | Ni-5 wt % Al |
| Dispersant | 1 | BYK110 |
| Binder | 5.5 | B72 (Monsanto) |
| Plasticizer | 4.5 | DBP(dibutyl phthalate) |
| Solvent | 60 | Ethanol/toluene = 60/40 |
| Defoamer | 1 | D348 |

Example 2

In this Example, there is provided a Ni—Al alloy anode for a molten carbonate fuel cell having improved creep property by using Cr as an additive instead of $CeO_2$.

Figure 2:
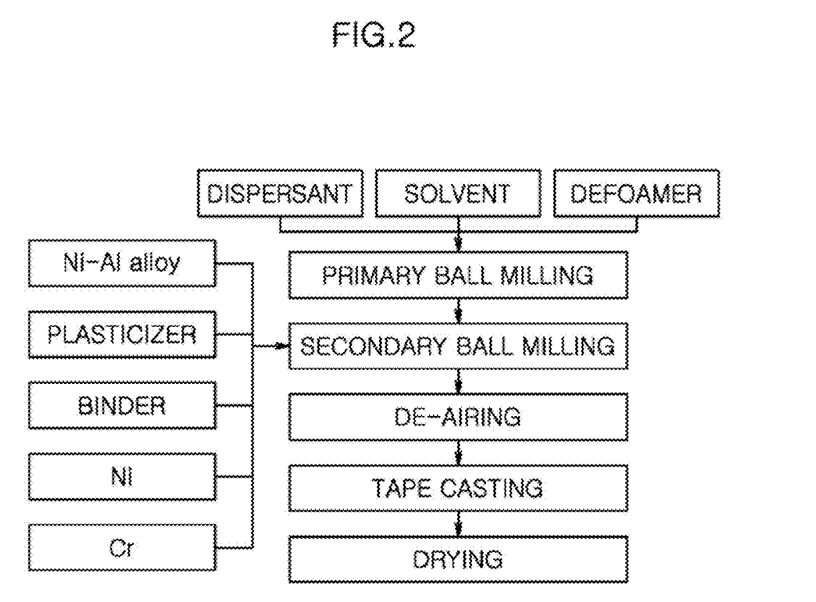
FIG. 2 is a flow chart illustrating a method for manufacturing Ni and Ni—Al alloy anode using Cr as an additive in Example 2.

FIG. 2 is a flow chart illustrating a method for manufacturing Ni and Ni—Al alloy anode using Cr as an additive in Example 2.

As shown in FIG. 2, the fundamental process is the same as Example 1, except that Cr is added during the secondary ball milling.

TABLE 2

| | Weight ratio | Characteristics |
|---|---|---|
| Cr | 0.5/1/2 | 1-5 μm (Alfa) |
| Ni | 60 | INCO Type 255 |
| Ni—Al Alloy | 40 | Ni-5 wt. % Al |
| Dispersant | 1 | BYK110 |
| Binder | 5.5 | B72 (Monsanto) |
| Plasticizer | 4.5 | DBP (dibutyl phthalate) |
| Solvent | 60 | Ethanol/toluene = 60/40 |
| Defoamer | 1 | D348 |

The anodes manufactured as green sheets as described above are sintered at 650° C. under reductive atmosphere and characteristics analysis is carried out.

Comparative Example

Meanwhile, an electrode is obtained by using nickel and $CeO_2$ alone without use of nickel-aluminum alloy, as a comparative example to Examples 1 and 2. The electrode is manufactured in the same manner as Example 1 except that nickel-aluminum alloy is not used.

[Characteristics Analysis]

Figure 3:
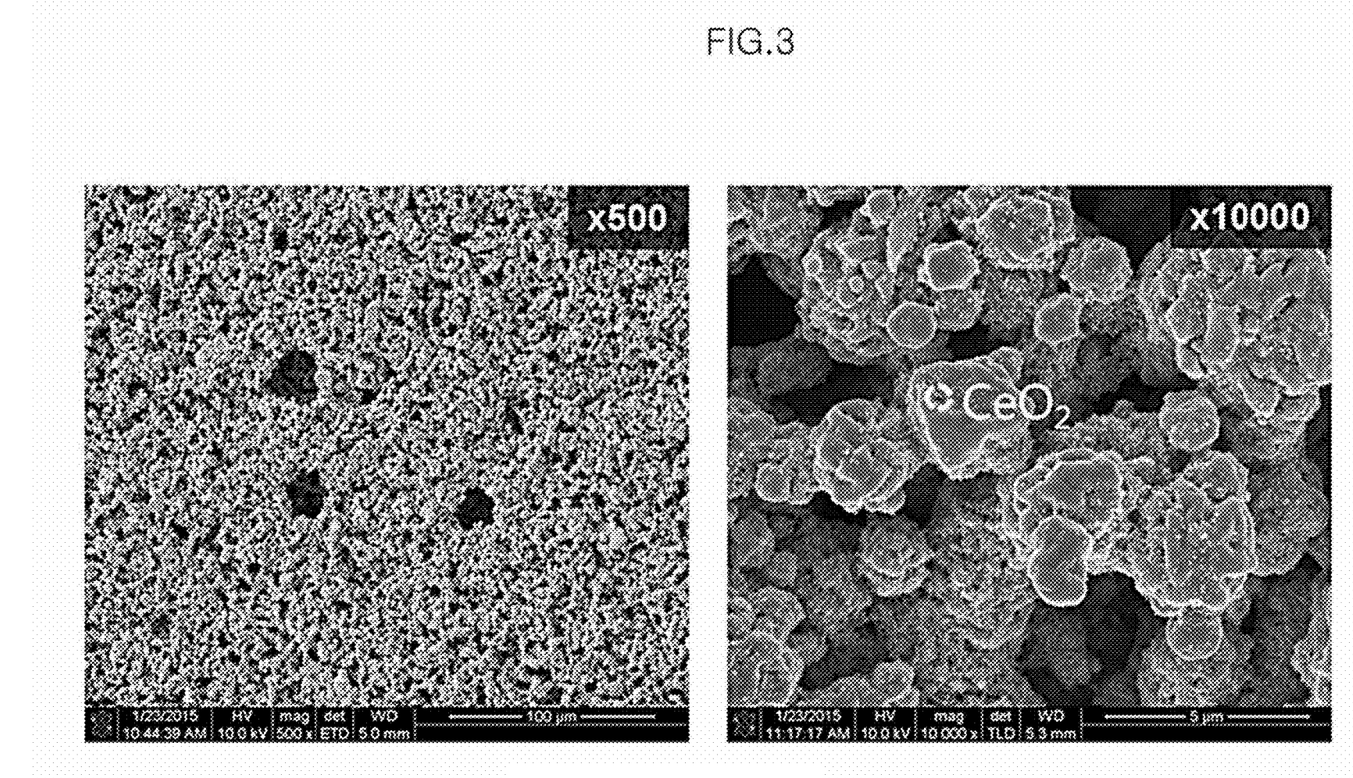
FIG. 3 is scanning electron microscopic (SEM) images of the anode to which 2% of $CeO_2$ is added in Example 1.

FIG. 3 is scanning electron microscopic (SEM) images of the anode to which 2% of $CeO_2$ is added in Example 1.

Referring to the right-side image of FIG. 3, it can be seen that $CeO_2$ is attached onto the surface of Ni powder and Ni—Al alloy.

Figure 4:
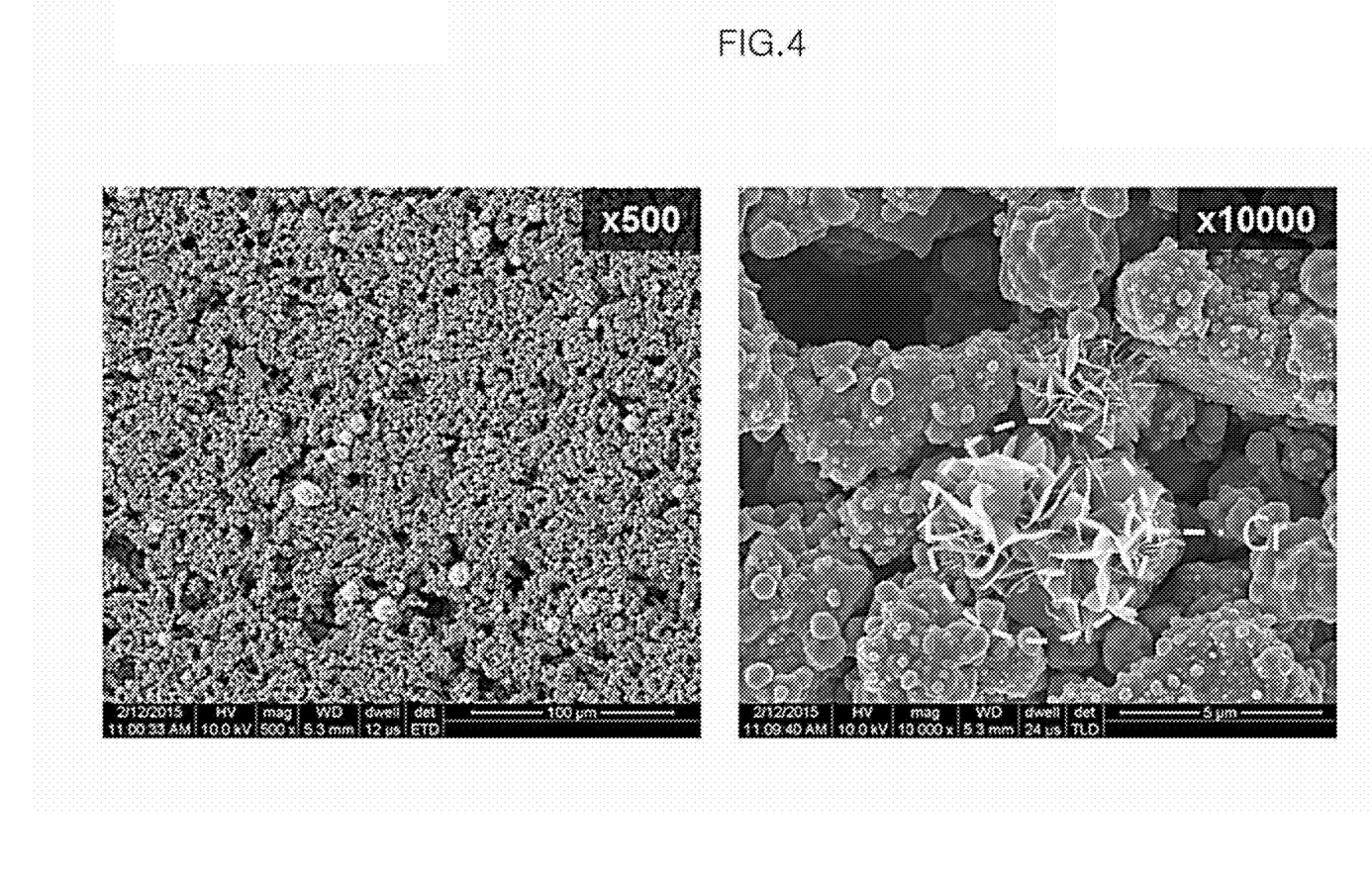
FIG. 4 is SEM images of the anode to which 2% of Cr is added in Example 2.

FIG. 4 is SEM images of the anode to which 2% of Cr is added in Example 2.

Similarly, it can be seen that Cr is attached onto the surface of Ni powder and Ni—Al alloy.

Figure 5:
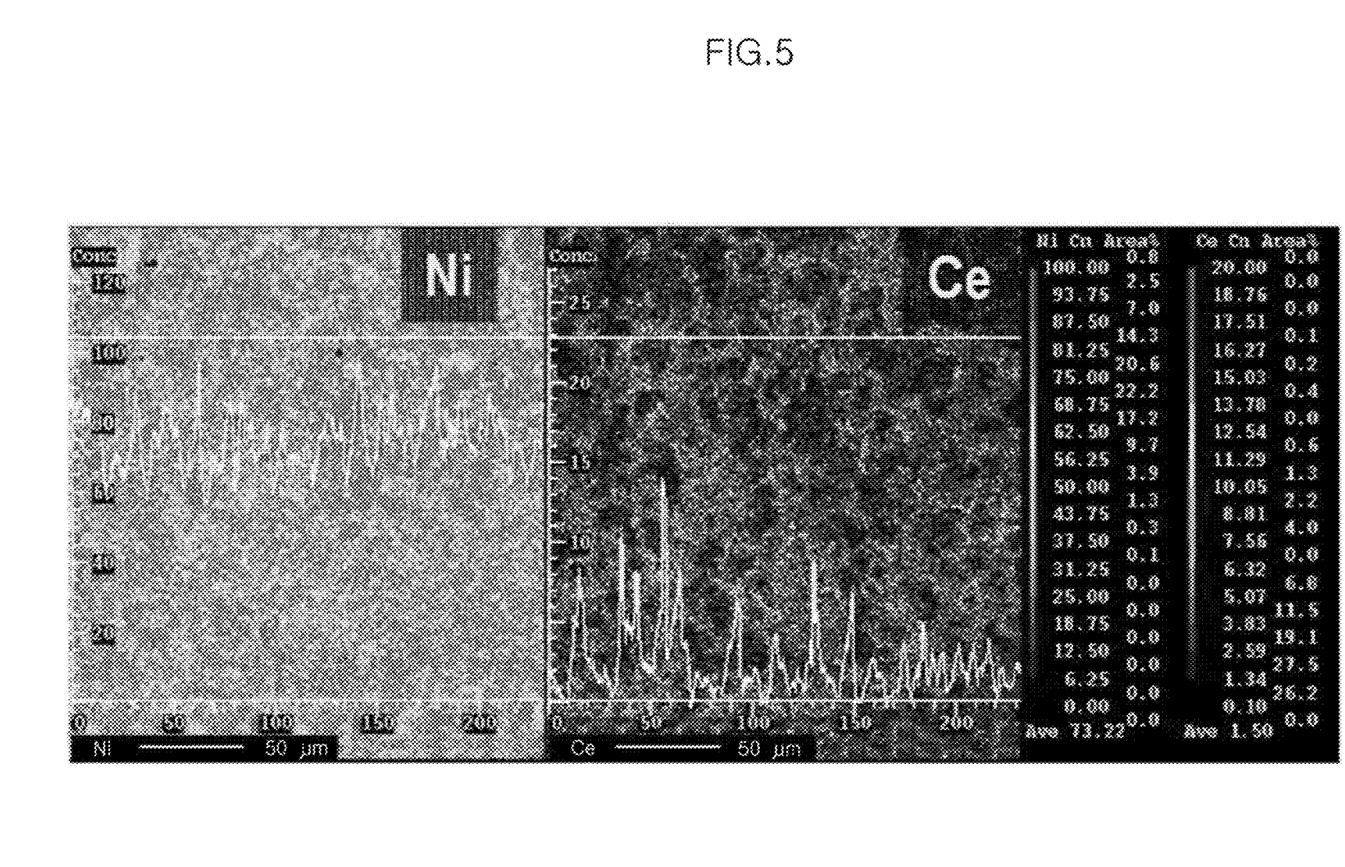
FIG. 5 shows results of the dispersion degrees of Ni and Ce in the anode to which 2% of $CeO_2$ is added in Example 1, as determined by mapping with an electron probe microanalyzer.

FIG. 5 shows results of the dispersion degrees of Ni and Ce in the anode to which 2% of $CeO_2$ is added in Example 1, as determined by mapping with an electron probe microanalyzer.

It can be seen from the dispersion degrees of Ni and Ce that both Ni and Ce are distributed uniformly. Similarly, it can be seen that Cr is dispersed uniformly.

In addition, to determine whether or not the Ni—Al alloy anode for a molten carbonate fuel cell having improved creep property is suitable for a porous anode of a fuel cell, the porosity and average pore diameter are measured.

In the case of the Ni—Al alloy anode for a molten carbonate fuel cell having improved creep property by using $CeO_2$ as an additive, it has an average porosity of 55.2% and an average pore diameter of 1.55 μm.

In the case of the Ni—Al alloy anode for a molten carbonate fuel cell having improved creep property by using Cr as an additive, it has an average porosity of 50.3% and an average pore diameter of 1.53 μm. Thus, it can be seen that the two porous anodes are suitable for an anode of a molten carbonate fuel cell.

Meanwhile, a creep test is carried out to determine a long-term stability of the anode under a high-temperature pressurized condition. The creep test is carried out under $H_2$ atmosphere at 650° C. for 100 hours by applying a surface pressure of 100 psi from a pressurization bar using a pneumatic cylinder. The creep test is carried out until 100 hours. After 100 hours, the test system is disassembled to determine a creep strain (%) according to the formula of [(thickness before test–thickness after test)/thickness before test]×100.

The following Table 3 shows results of creep strains of the anodes to which $CeO_2$ or Cr is added in the Examples.

TABLE 3

| Additive | | Weight of additive | Creep strain (%) |
|---|---|---|---|
| Example 1 | $CeO_2$ | 0.5% | 3.62 |
| | | 1% | 2.84 |
| | | 2% | 3.26 |
| Example 2 | Cr | 0.5% | 2.82 |
| | | 1% | 4.47 |
| | | 2% | 2.85 |

Figure 6:
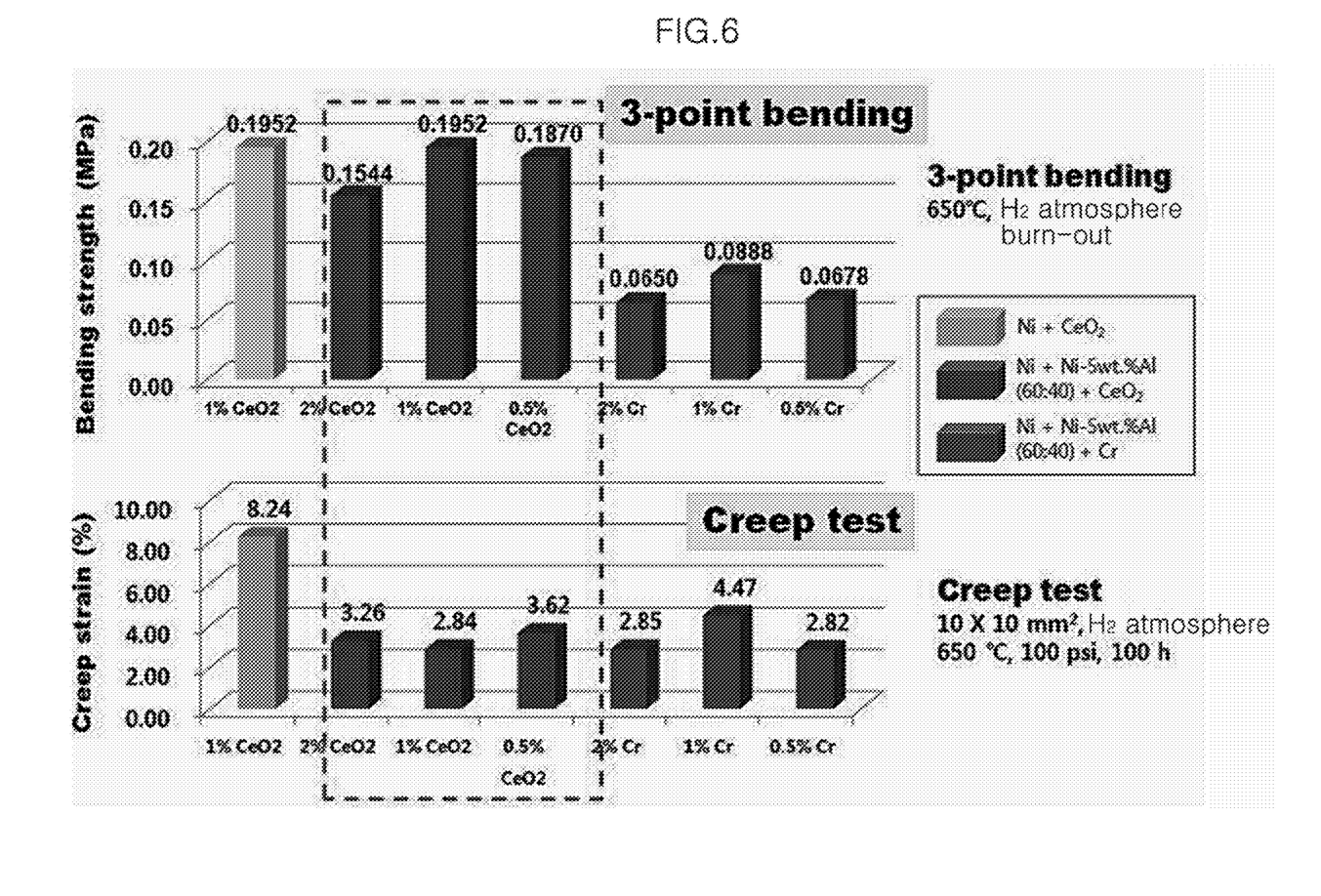
FIG. 6 is a graph illustrating results of bending strength and creep strain of each of the electrodes according to Examples and Comparative Example.

Meanwhile, FIG. 6 is a graph illustrating results of bending strength and creep strain of each of the electrodes in the Examples and Comparative Example.

As can be seen from Table 3 and FIG. 6, when using Ni powder alone, the anode shows a very high creep strain of 7% or more. However, when adding $CeO_2$ or Cr, the anode shows a creep strain of 3% or less. In addition, it can be seen that mechanical strength is improved as compared to the conventional Ni-5 wt % Al alloy anode (mechanical strength 0).

[Operation of Molten Carbonate Fuel Cell]

An anode unit cell may be operated largely in two different modes. First, a prepared anode green sheet is sintered and then assembled in the form of a molten carbonate fuel cell.

Second, an anode green sheet is used directly for a molten carbonate fuel cell and then sintering is carried out. When operating a unit cell by using an anode green sheet, nickel mesh may be used to prevent the electrode from being damaged by the contact with a collector during sintering.

The unit cell is operated at 650° C. and has an area of 100 cm². The gas availability is 40% based on 150 mA/cm², and the gas composition is $H_2:CO_2:H_2O$=72:18:10 at the anode and $O_2:CO_2$=33:67 (Air:$CO_2$=70:30) at the cathode.

Figure 7:
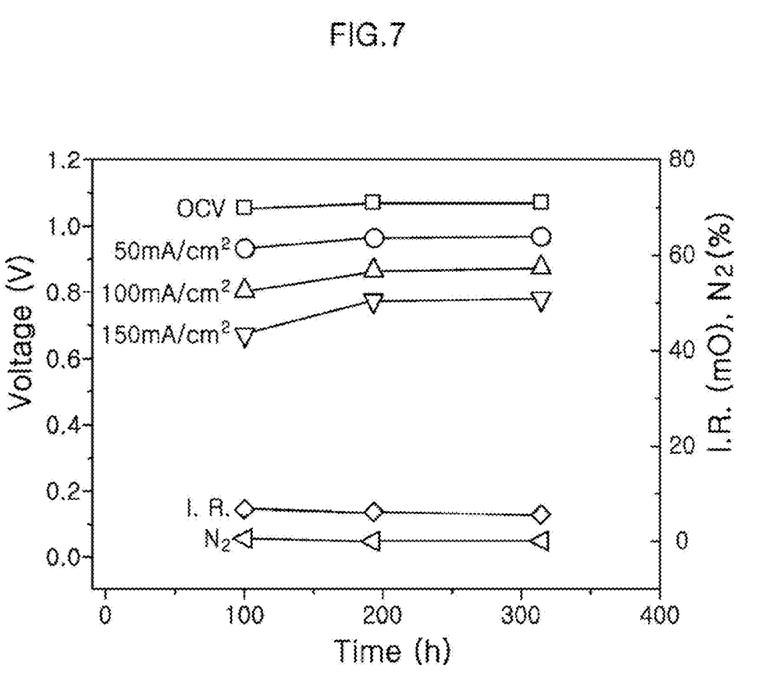
FIG. 7 is a graph illustrating results of operation of the anode unit cell to which 0.5 wt % of $CeO_2$ is added in Example 1.

FIG. 7 is a graph illustrating results of operation of the anode unit cell to which 0.5 wt % of $CeO_2$ is added in Example 1.

FIG. 7 shows the results obtained after the anode green sheet is used directly and sintering is carried out in the cell in situ. At around the point of 300 hours where the performance of the unit cell is stabilized, the open circuit voltage (OCV) is 1.068 V. This is similar to the theoretical OCV at a reaction temperature of 650° C. The internal resistance (IR) is 5.6 mΩ, the proportion of $N_2$ measured at the portion of the anode gas outlet is about 0.14%, and the unit cell shows 0.78 V at 150 mA/cm$^2$. As can be seen from the above results, the Ni—Al alloy anode for a molten carbonate fuel cell having improved creep property according to example embodiments of the present disclosure shows high quality and may be applied to a molten carbonate fuel cell.

What is claimed is:

1. A method for preparing an anode for a molten carbonate fuel cell, comprising adding at least one additive for imparting creep resistance selected from the group consisting of $CeO_2$ and Cr to nickel-aluminum alloy powder and nickel powder to improve creep property,
   wherein the additive for imparting creep resistance is added to the nickel-aluminum powder and the nickel powder, a resultant mixture is subjected to tape casting to obtain a sheet, and then sintering is carried out.

2. The method for preparing an anode for a molten carbonate fuel cell according to claim 1, wherein the sheet is mounted to a molten carbonate fuel cell and then sintering is carried out in the molten carbonate fuel cell.

3. The method for preparing an anode for a molten carbonate fuel cell according to claim 1, wherein dispersant, plasticizer, solvent, binder and defoamer are further added.

4. A method for preparing an anode for a molten carbonate fuel cell according to claim 1, further comprising:
   adding Cr as an additive for imparting creep resistance to nickel-aluminum alloy powder and nickel powder to improve creep property,
   subjecting dispersant, solvent and defoamer to primary ball milling;
   mixing the resultant mixture with the nickel-aluminum alloy powder and the nickel powder, plasticizer, binder and the Cr after the primary ball milling, and subjecting the resultant mixture to secondary ball milling; and
   carrying out de-airing and tape casting after the secondary ball milling.

5. A method for preparing an anode for a molten carbonate fuel cell, comprising adding an additive for imparting creep resistance, wherein the additive is $CeO_2$, to nickel-aluminum alloy powder and nickel powder to improve creep property, which comprises:
   mixing $CeO_2$ with dispersant, solvent and defoamer, and subjecting the mixture to primary ball milling;
   mixing the resultant mixture with the nickel-aluminum alloy powder and the nickel powder, plasticizer and binder after the primary ball milling, and subjecting the resultant mixture to secondary ball milling; and
   carrying out de-airing and tape casting after the secondary ball milling.

6. An anode for a molten carbonate fuel cell including sintered nickel powder and nickel-aluminum alloy powder, prepared by a process comprising:
   adding at least one additive for imparting creep resistance selected from the group consisting of $CeO_2$ and Cr to nickel-aluminum alloy powder and nickel powder to improve creep property,
   wherein the additive for imparting creep resistance is added to the nickel-aluminum powder and the nickel powder, a resultant mixture is subjected to tape casting to obtain a sheet, and then sintering is carried out, wherein the at least one additive for imparting creep resistance selected from the group consisting of $CeO_2$ and Cr is attached to nickel and nickel-aluminum alloy to improve creep property.

7. The anode for a molten carbonate fuel cell according to claim 6, wherein the additive for imparting creep resistance selected from the group consisting of $CeO_2$ and Cr interrupt a creep phenomenon on the nickel or nickel-aluminum alloy surface, thereby improving creep resistance.

8. The anode for a molten carbonate fuel cell according to claim 6, wherein the nickel-aluminum alloy is present in an amount of 30-70 wt % based on the weight of the nickel-aluminum alloy and nickel.

9. The anode for a molten carbonate fuel cell according to claim 6, wherein the additive for imparting creep resistance is used in an amount of 0.2-5 wt % based on the total weight of the nickel-aluminum and nickel.

10. The anode for a molten carbonate fuel cell according to claim 6, wherein $CeO_2$ has a size of 20 nm-0.3 μm and Cr has a size of 1-5 μm.

11. A molten carbonate fuel cell comprising the anode as defined in claim 6.

* * * * *